United States Patent
Khlat

(10) Patent No.: US 7,117,234 B2
(45) Date of Patent: Oct. 3, 2006

(54) WAVEFORM GENERATOR FOR USE IN IQ MODULATION

(75) Inventor: Nadim Khlat, Cugnaux (FR)

(73) Assignee: Freescale Semiconductor, Inc., Austin, TX (US)

(*) Notice: Subject to any disclaimer, the term of this patent is extended or adjusted under 35 U.S.C. 154(b) by 658 days.

(21) Appl. No.: 10/433,750

(22) PCT Filed: Oct. 22, 2001

(86) PCT No.: PCT/EP01/12402

§ 371 (c)(1),
(2), (4) Date: Jun. 6, 2003

(87) PCT Pub. No.: WO02/47344

PCT Pub. Date: Jun. 13, 2002

(65) Prior Publication Data

US 2004/0019620 A1    Jan. 29, 2004

(30) Foreign Application Priority Data

Dec. 7, 2000    (EP) .................................. 00403442

(51) Int. Cl.
*G06F 1/02* (2006.01)
(52) U.S. Cl. .................................................. 708/270
(58) Field of Classification Search .................... None
See application file for complete search history.

(56) References Cited

U.S. PATENT DOCUMENTS

| | | |
|---|---|---|
| 4,486,846 A | 12/1984 | McCallister et al. |
| 5,878,335 A | 3/1999 | Kushner |
| 7,046,738 B1 * | 5/2006 | Dent ........................... 375/296 |
| 2004/0041644 A1 * | 3/2004 | Khlat .......................... 332/103 |

FOREIGN PATENT DOCUMENTS

| | | |
|---|---|---|
| EP | 0 604 381 A2 | 6/1994 |
| EP | 0 782 063 A1 | 7/1995 |
| EP | 0 469 233 B2 | 6/2002 |

OTHER PUBLICATIONS

Napier, "Push Numerically Controlled Oscillators Beyond Their Limits," *EDN Electrical Design News*, US, Cahners Publishing Co., Newton, Massachusetts, Sep. 12, 1997, vol. 42, No. 19, pp. 119-124, 126, 127.
PCT/EP01/12402 PCT International Search Report mailed Aug. 20, 2002.
LaMacchia et al., "Flight GaAs Numerically Controlled Oscillator," *GaAs IC Symposium*—CH2730-0/89/0000-0049, *IEEE*, 1989, pp. 49-52.

* cited by examiner

*Primary Examiner*—D. H. Malzahn

(57) ABSTRACT

A waveform generator for use in IQ modulation in a wireless cellular device having an FM waveform generator (104) that is programmable to generate a desired FM frequency deviation; a digital accumulator (108, 110, 112) to provide phase generation.

First and second look-up tables 114 and 116 use the 6 MSBs and the 6 LSBs of 12-bit digital accumulator values to look up phase-space values that are combined in complex multipliers (130, 140), which are re-used from other parts of the circuit.

This provides the following advantage(s):

Support of both FM and I/Q modulation techniques for constant envelope modulation; low cost implementation; and flexibility to address multimode systems.

11 Claims, 4 Drawing Sheets

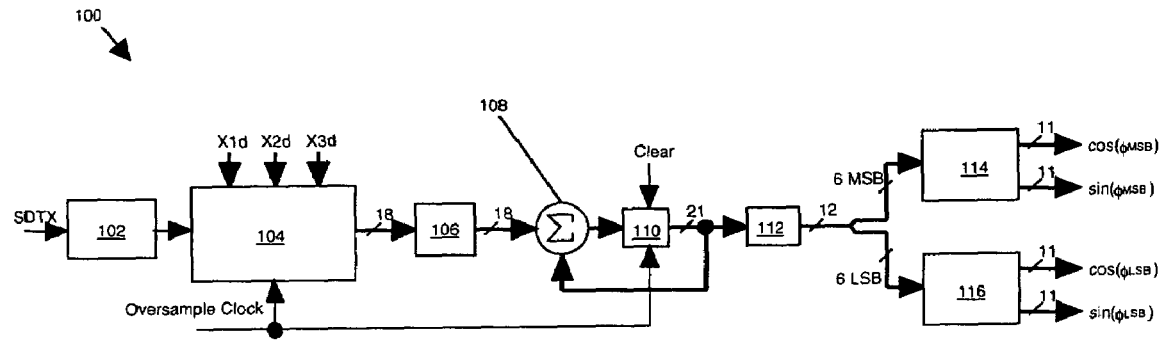
FIG. 1A
FIG. 1B
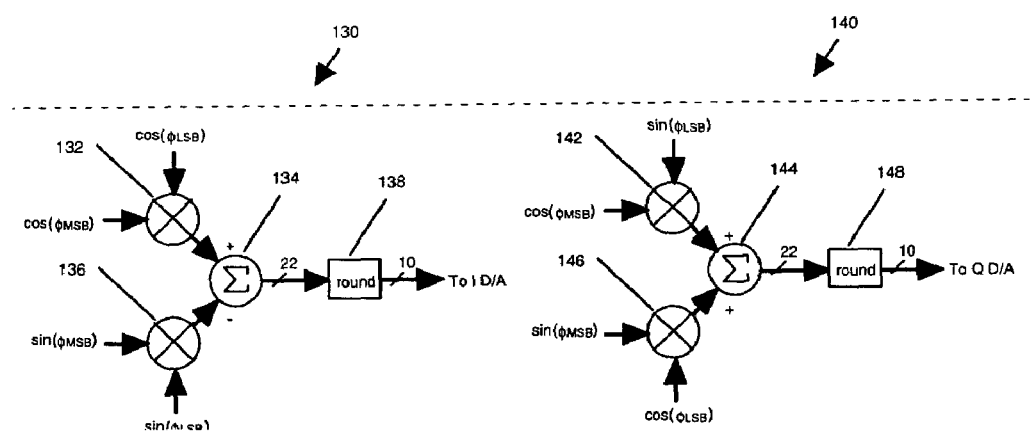

WAVEFORM GENERATOR FOR USE IN IQ MODULATION

FIELD OF THE INVENTION

This invention relates to waveform generators for use in IQ (In-phase, Quadrature-phase) modulation. IQ modulators are used in inter alia circuitry of wireless communications transceivers, such as mobile telephones.

BACKGROUND OF THE INVENTION

In the field of this invention it is known to provide either IQ modulation or FM (Frequency Modulation) direct PLL (Phase Locked Loop) modulation as separate types of modulation techniques, each with its own dedicated circuitry.

However, this approach has the disadvantage(s) that if a single circuit is desired to provide multi-mode operation (i.e., operation in any of a desired range of communications protocols requiring different modulation schemes, e.g., GSM (General System for Mobile communications), Bluetooth, HomeRF, AMPS (Advanced Mobile Phone Service), TETRA (Terrestrial Trunked Radio), CDMA (Code Division Multiple Access), etc.), the need to provide multiple modulation circuits for multiple possible modulation schemes significantly increases cost and power consumption.

As an example, if a GSM-only radio mode is required, then FM modulation would be used. If GSM and EDGE modulation are required where an IQ modulator is needed for EDGE, then GSM modulation through an IQ modulator rather FM modulator would be used, assuming that the RF IQ modulator meets the receiver noise requirements to avoid using a TX filter or duplexer.

A need therefore exists for having an FM modulation and/or an IQ modulation on the same transceiver circuit, and for a waveform generator for use in IQ modulation wherein the abovementioned disadvantage(s) may be alleviated.

STATEMENT OF INVENTION

In accordance with the present invention there is provided a waveform generator for use in IQ modulation as claimed in claim 1.

BRIEF DESCRIPTION OF THE DRAWINGS

One waveform generator circuit for use in an IQ modulator of cellular radio transceiver incorporating the present invention will now be described, by way of example only, with reference to the accompanying drawing(s), in which:

FIG. 1A and FIG. 1B show block schematic diagrams of the frequency modulation and IQ modulation sections of the waveform generator circuit.

DESCRIPTION OF PREFERRED EMBODIMENT(S)

Figure 2:
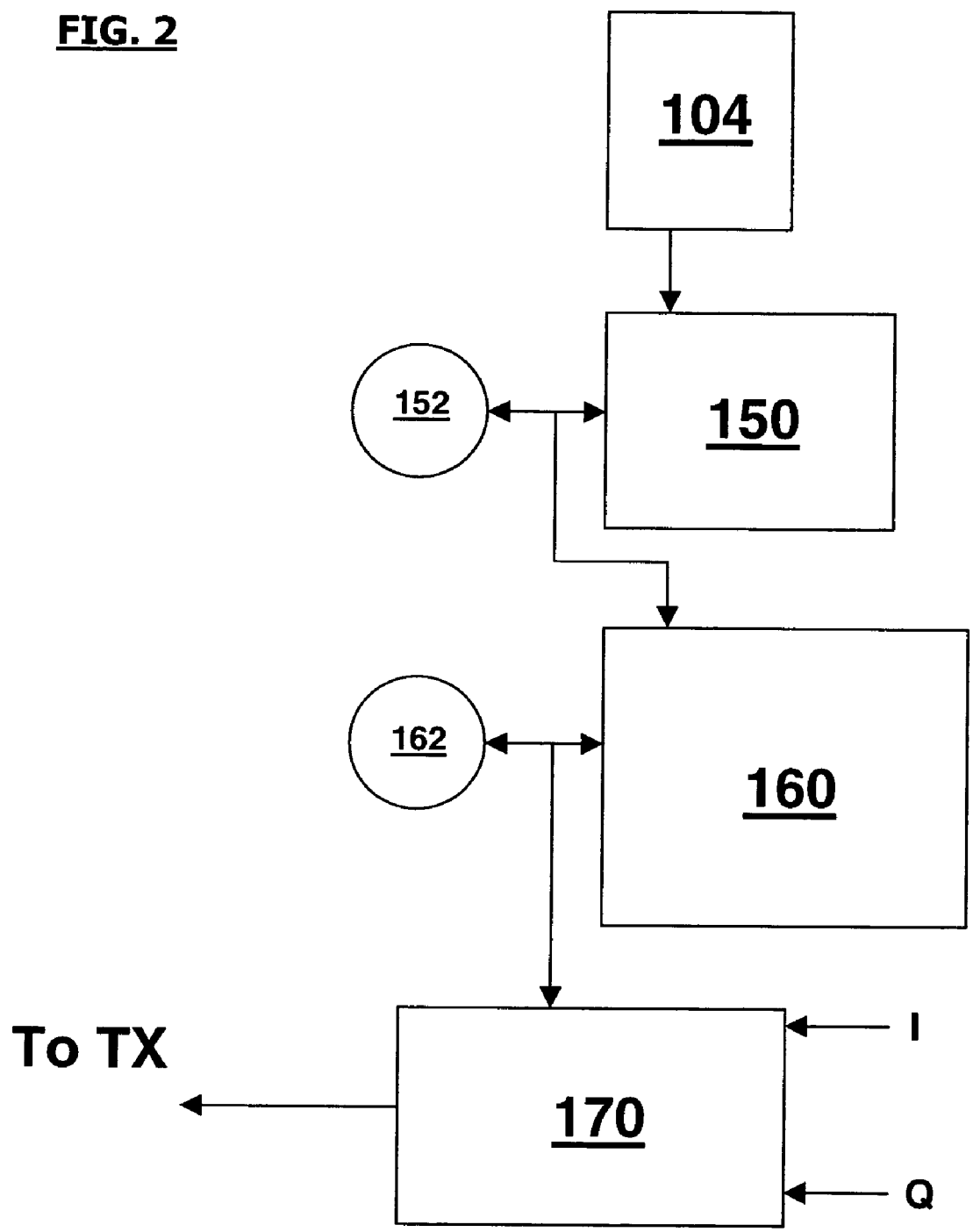
FIG. 2 shows a block schematic diagram illustrating waveform scaling performed in the circuit.

Referring firstly to FIG. 1, the FM and IQ modulation sections in the transmit section of a cellular radio transceiver circuit 100 include a phase mapping circuit 102 (e.g., in GSM, a differential encoder) for receiving a transmit signal SDTX (comprising serial bits to be transmitted that are received from a host processor unit—not shown). The output of the phase mapping circuit 102 is connected to a programmable FM pre-distortion waveform generator 104, which receives data inputs X1$d$, X2$d$ and X3$d$ from a look-up table (not shown) and receives an oversampled clock signal from a clock signal generator (also not shown). The FM waveform generator 104 produces an 18-bit output that is applied via a divider 106 (which divides by a factor of $2^9$) to a digital accumulator constituted by an adder 108, a register 110 and a rounder 112. The register 110 is clocked by the same oversampled clock signal as the FM waveform generator 104 and is arranged to be cleared on a rising edge of a DMCS signal (a trigerring signal, to start the transmit modulation, whose duration is nearly equal to the transmit burst length; this signal is typically received from a timing unit located in the host processor—not shown), and the output of the register 110 is fed back to an input of the adder 108.

The 21-bit output of the register 110 is rounded in a rounder 112 to 12-bits, which are split into two parallel data streams comprising respectively the six most significant bits and the six least significant bits of the rounded accumulator value. The six most significant bits are applied to a 16-word MSB Phase Look-Up table 114 to produce pairs of 11-bit values representative of the cosine and sine values ($\cos_{(\phi MSB)}$ and $\sin_{(\phi MSB)}$ respectively) of points in phase-space given by the input six most significant bits. Similarly, the six least significant bits are applied to a 64-word LSB Phase Look-Up table 116 to produce pairs of 11-bit values representative of the cosine and sine values ($\cos_{(\phi LSB)}$ and $\sin_{(\phi LSB)}$ respectively) of points in phase space given by the input six least significant bits. It will be understood that splitting the 12-bit rounded accumulator signal into its six most significant bits and its six least significant bits requires the respective look-up tables 114 and 116 to have sizes of 16 and 64 words respectively, and that the resultant combined size of 80 words is the minimum size, and so allows minimization of total integrated circuit area occupied by these look-up tables.

It is also possible to split the 12-bit rounded accumulator signal into its seven most significant bits and five least significant bits, requiring look-up tables 114 and 116 to have sizes of 32 and 32 words respectively, assuming that a quarter table length is stored in table 114 (by taking advantage of the symmetry of the sine and cosine function).

Also, the least significant bits look-up table 116 that stores $\cos_{(\phi LSB)}$ and $\sin_{(\phi LSB)}$ of the phase that corresponds to $\phi_{LSB}$ can be approximated to 1 and $\phi_{LSB}$ respectively since $\phi_{LSB}$ is very small, in which case the look-up table 116 can be removed.

Referring now also to FIG. 1B, the MSB and LSB sine and cosine values produced from the look-up tables 114 and 116 are combined in complex multiplier arrangements 130 and 140 in-phase (I) and quadrature-phase (Q) modulation values for application to respective digital/analog (D/A) converters (not shown) for subsequent transmission.

The complex multiplier arrangement 130 has a multiplier 132 that receives the most significant bit cosine value ($\cos_{(\phi MSB)}$) from the look-up table 114 and the least significant bit cosine value ($\cos_{(\phi LSB)}$) from the look-up table 116 and produces a multiplied output to an adder 134. The complex multiplier arrangement 130 also has a multiplier 136 that receives the most significant bit sine value ($\sin_{(\phi MSB)}$) from the look-up table 114 and the least significant bit sine value ($\sin_{(\phi LSB)}$) from the look-up table 116 and produces a multiplied output to the adder 134. The adder 134 produces a 22-bit output, which is rounded to 10 bits in a rounder 138, and this 10-bit rounded value is applied to an in-phase (I) D/A converter (not shown) for transmission. It will thus be understood that the rounded value (I) at the output of the complex multiplier arrangement 130 is given by:

$$I = \cos_{(\phi LSB + \phi MSB)}.$$

The complex multiplier arrangement 140 has a multiplier 142 that receives the most significant bit cosine value ($\cos_{(\phi MSB)}$) from the look-up table 114 and the least significant bit sine value ($\sin_{(\phi LSB)}$) from the look-up table 116 and produces a multiplied output to an adder 144. The complex multiplier arrangement 140 also has a multiplier 146 that receives the most significant bit sine value ($\sin_{(\phi MSB)}$) from the look-up table 114 and the least significant bit cosine value ($\cos_{(\phi LSB)}$) from the look-up table 116 and produces a multiplied output to the adder 144. The adder 144 produces a 22-bit output, which is rounded to 10 bits in a rounder 148, and this 10-bit rounded value is applied to a quadrature-phase (Q) D/A converter (not shown) for transmission. It will thus be understood that the rounded value (Q) at the output of the complex multiplier arrangement 140 is given by:

$$Q = \sin_{(\phi LSB + \phi MSB)}.$$

It will further be understood that the complex multipliers 130 and 140 need not be provided exclusively for the use described above for transmission, but instead IQ multipliers provided elsewhere in the circuit (for example, in the receiver section, or in the transmit section where pulse shaping filtering occurs using Finite Impulse Response (FIR) circuitry) can be re-used for this purpose.

Referring now also to FIG. 2, in the transceiver circuit 100 the FM waveform generator 104 is arranged to drive a main receive phase-locked-loop (PLL) 150 in conjunction with a receive voltage-controlled oscillator (RX VCO) 152. The RX VCO signal is used to drive a near-unity transmission PLL loop (of known type) 160 in conjunction with a transmit voltage-controlled oscillator (TX VCO) 162. The TX VCO signal is used to drive an IQ RF modulator section 170, which receives the I and Q signals produced by the complex multipliers 130 and 140 described above in relation to FIG. 1.

The cascade of two PLLs, i.e. the PLL 150 and the PLL 160, is used for direct TX modulation to remove any remodulation effect of the transmit VCO where the TX VCO 162 is within a loop PLL which has large bandwidth since it operates with a high reference clock derived from 152 and uses a near unity divider, while the reference clock 152 is derived from a narrow loop PLL.

It will be understood that FM modulation may be achieved by use of the first phase-locked loop 150 and the second transmit loop 160, with the in-phase and quadrature-phase inputs of the IQ modulator 170 set to their maximum values.

Figure 3:
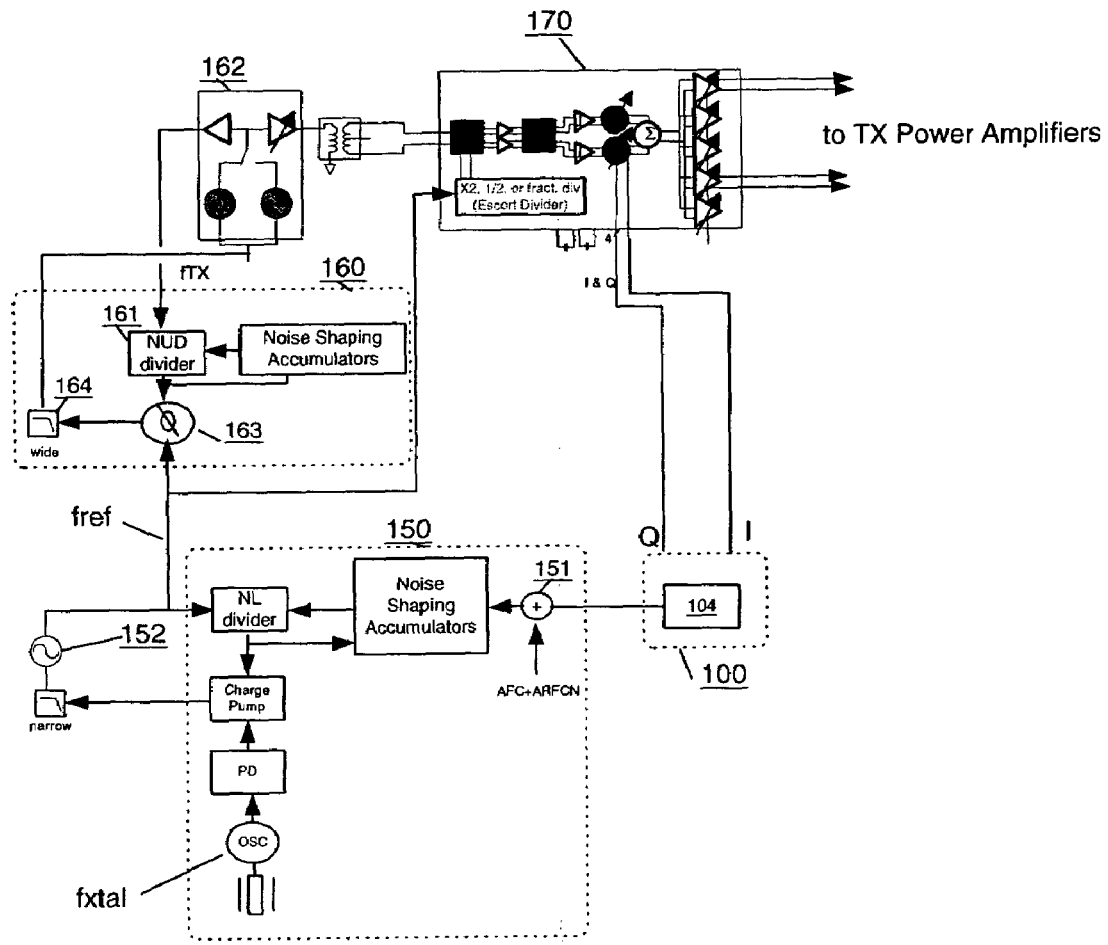
FIG. 3 shows a first cascaded PLL arrangement, incorporating the waveform generator circuit of FIG. 1, for direct TX modulation to remove any remodulation effect.

Referring now also to FIG. 3, it is possible to pass any FM modulation through the near-unity transmit loop 160 (as is known for GSM modulation) by modulating the first PLL 150 through noise shaping circuitry and also scale the FM frequency deviation by reprogramming the waveform generator coefficients to compensate the multiplication factor of the near-unity divider 161 in the transmit loop 160, where the output frequency can be expressed as:

$$FTX = fxtal \cdot NUD \cdot NL \text{ since } fTX = fref \cdot NUD, \text{ where}$$
NUD is the near unity value.

Figure 4:
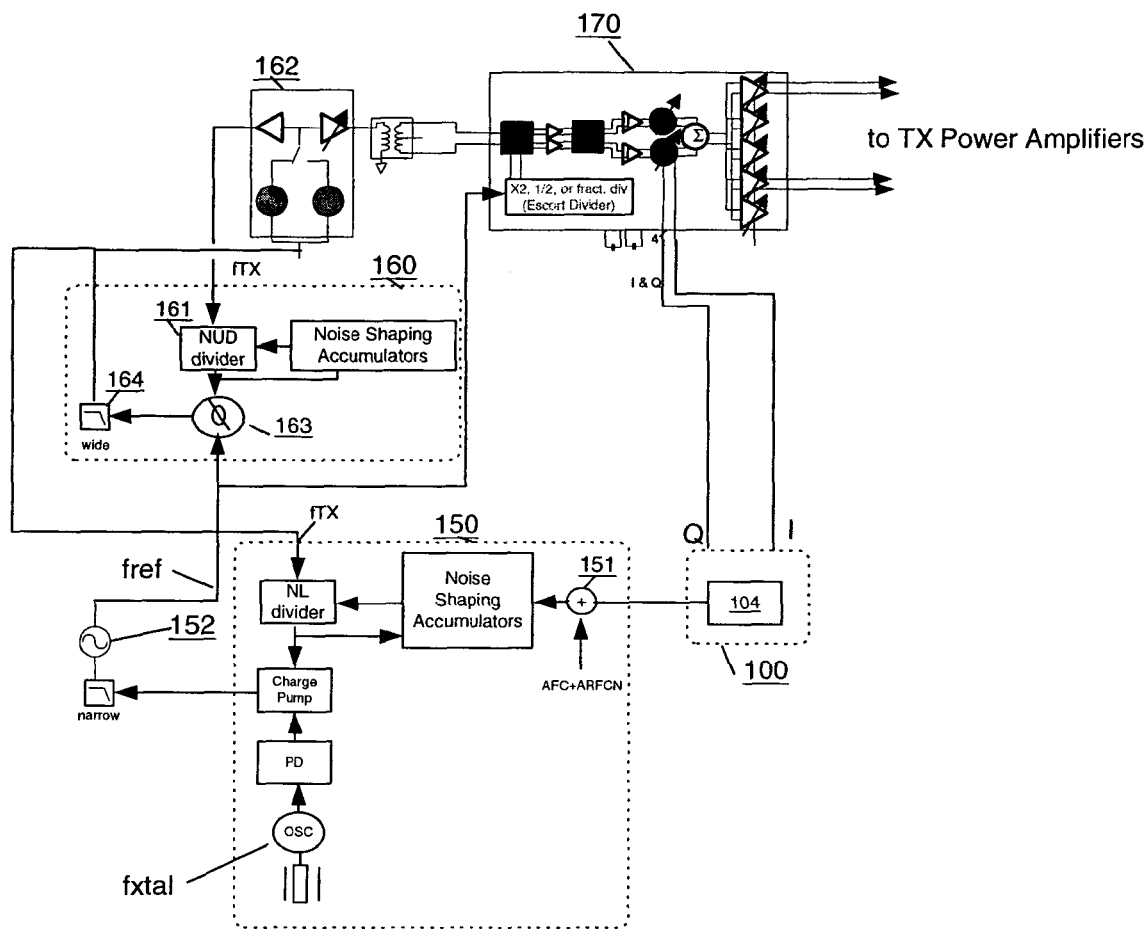
FIG. 4 shows a second cascaded PLL arrangement, incorporating the waveform generator circuit of FIG. 1, for reducing close-in noise.

Referring also to FIG. 4, in order to reduce the close-in noise of the arrangement shown in FIG. 3, the feedback point of TX VCO 162 is coupled not only at the near-unity transmit loop, but also at the NL divider in 150, since the noise source effect on phase comparator/frequency steering and charge pump 163 of the PLL 160 is reduced by having the loop PLL 160 encompass within the PLL 150 without compromising stability since loop PLL 160 is of wider bandwidth than loop PLL 150. By reducing the overall close-in noise of the cascaded PLLs, it is possible then to pass on FM modulation with low close-in noise.

This modulation is passed to the TX VCO 162, which avoids then using an RF switch.

It will, of course, be appreciated that the present invention and the above-described embodiment(s) lend themselves readily to use in integrated circuit form, embodied in an arrangement of one or more integrated circuits, where many of the invention's advantages assume greater significance.

It will be understood that the waveform generator for use in IQ modulation described above provides the following advantages:

It supports both FM and I/Q modulation techniques for constant envelope modulation It provides a low cost implementation It provides flexibility to address multimode systems It allows FM modulation through cascaded PLLs that are used in Direct Launch I/Q systems for remodulation cancellation.

The invention claimed is:

1. A waveform generator (100) for use in IQ modulation, comprising:

digital frequency modulation waveform generator means (104) for generating digital values representative of any of a predetermined range of desired frequency modulation schemes;

digital accumulator means (108, 110, 112) for accumulating digital values produced by said digital frequency modulation waveform generator means;

first look-up means for receiving only a most significant group of bits produced by the digital accumulator means and for looking up in a first look-up table (114) phase-space values ($\cos_{(\phi MSB)}$, $\sin_{(\phi MSB)}$) associated with the received most significant group of bits;

second look-up means for receiving only a least significant group of bits produced by the digital accumulator means and for looking up in a second look-up table (116) phase-space values ($\cos_{(\phi LSB)}$, $\sin_{(\phi LSB)}$) associated with the received least significant group of bits; and combining means (130, 140) for combining the phase-space values produced by the first and second look-up means to produce in-phase and quadrature-phase values (I, Q) for transmission modulation.

2. The waveform generator according to claim 1 wherein said most significant group of bits and said least significant group of bits each comprise substantially half the number of bits in the values produced by said digital accumulator means.

3. The waveform generator according to claim 1 wherein:

said values produced by said digital accumulator means comprise 12 bits;

said most significant group of bits comprises 7 bits and said least significant group of bits comprises 5 bits;

said first look-up table comprises 32 words; and said second look-up table comprises 32 words.

4. The waveform generator according to claim 1 wherein said values produced by the digital accumulator means comprise 12 bits, and wherein the waveform generator further comprises:

look-up means for receiving only the most significant 7 bits of values produced by the digital accumulator means and for looking up in a first look-up table (114) phase-space values ($\cos_{(\phi MSB)}$, $\sin_{(\phi MSB)}$) associated with the received most significant 7 bits;

approximating means for receiving only the least significant 5 bits produced by the digital accumulator means and for deriving therefrom phase-space values ($\cos_{(\phi LSB)}$, $\sin_{(\phi LSB)}$) associated therewith by approximating to unity a cosine value associated therewith and approximating to the value of the least significant 5 bits a sine value associated therewith; and combining means (130, 140) for combining the phase-space values produced by the look-up means and the approximating means to produce in-phase and quadrature-phase values (I, Q) for transmission modulation.

5. The waveform generator according to claim 4 wherein said combining means comprises:

first multiplier means (132 or 142) for multiplying a first pair of said phase-space values to produce a first multiplied value;

second multiplier means (136 or 146) for multiplying a second pair of said phase-space values to produce a second multiplied value; and summing means (134 or 144) for summing said first multiplied value and second multiplied value.

6. The waveform generator according to claim 4 wherein the combining means comprises means arranged for other uses.

7. The waveform generator according to claim 1 wherein said combining means comprises:

first multiplier means (132 or 142) for multiplying a first pair of said phase-space values to produce a first multiplied value;

second multiplier means (136 or 146) for multiplying a second pair of said phase-space values to produce a second multiplied value; and summing means (134 or 144) for summing said first multiplied value and second multiplied value.

8. The waveform generator according to claim 1 wherein the combining means comprises means arranged for other uses.

9. An integrated circuit transceiver arrangement for use in a wireless communication device and comprising a waveform generator according to claim 1.

10. A wireless communication device containing a waveform generator according to claim 1.

11. A waveform generator (100) for use in IQ modulation, comprising:

digital frequency modulation waveform generator means (104) for generating digital values representative of any of a predetermined range of desired frequency modulation schemes; and digital accumulator means (108, 110, 112) for accumulating digital values produced by said digital frequency modulation waveform generator means and for producing values comprising N bits, look-up means for receiving only the most significant M bits of values produced by the accumulator means and for looking up in a first look-up table (114) phase-digital space values ($\cos_{(\phi MSB)}$, $\sin_{(\phi MSH)}$) associated with the received most significant M bits;

approximating means for receiving only the least significant N–M bits produced by the digital accumulator means and for deriving therefrom phase-space values ($\cos(\phi LSB)$, $\sin_{(\phi LSB)}$) associated therewith by approximating to unity a cosine value associated therewith and approximating to the value of the least significant N–M bits a sine value associated therewith; and combining means (130, 140) for combining the phase-space values produced by the look-up means and the approximating means to produce in-phase and quadrature-phase values (I, Q) for transmission modulation.

* * * * *